United States Patent
Uchida et al.

(10) Patent No.: US 10,921,609 B2
(45) Date of Patent: Feb. 16, 2021

(54) TRANSMISSIVE DIFFUSER PLATE HAVING A MICROLENS ANGLE MODULATION DISTRIBUTION GROUP

(71) Applicant: KURARAY CO., LTD., Kurashiki (JP)

(72) Inventors: Atsushi Uchida, Kamisu (JP); Masaru Karai, Kamisu (JP); Koji Ishida, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 162 days.

(21) Appl. No.: 16/096,994

(22) PCT Filed: Apr. 25, 2017

(86) PCT No.: PCT/JP2017/016306
§ 371 (c)(1),
(2) Date: Oct. 26, 2018

(87) PCT Pub. No.: WO2017/188225
PCT Pub. Date: Nov. 2, 2017

(65) Prior Publication Data
US 2019/0146237 A1   May 16, 2019

(30) Foreign Application Priority Data

Apr. 27, 2016   (JP) .................... 2016-088904

(51) Int. Cl.
*G02B 5/02* (2006.01)
*G02B 27/48* (2006.01)
(Continued)

(52) U.S. Cl.
CPC ............. *G02B 27/48* (2013.01); *G02B 3/00* (2013.01); *G02B 5/02* (2013.01); *G02B 5/0215* (2013.01);
(Continued)

(58) Field of Classification Search
CPC . G02B 27/42; G02B 3/00; G02B 5/02; G02B 5/0278; G02B 5/0284; G02B 5/10;
(Continued)

(56) References Cited

U.S. PATENT DOCUMENTS

| 6,859,326 B2 * | 2/2005 | Sales | G02B 3/0043 |
| | | | 359/619 |
| 7,033,736 B2 * | 4/2006 | Morris | G02B 3/0043 |
| | | | 359/599 |

(Continued)

FOREIGN PATENT DOCUMENTS

| CN | 1386203 A | 12/2002 |
| JP | 2004-505306 A | 2/2004 |

(Continued)

OTHER PUBLICATIONS

Combined Chinese Office Action and Search Report dated Jan. 16, 2020, in Patent Application No. 201780026319.3 (with English translation), 19 pages.
(Continued)

*Primary Examiner* — Arnel C Lavarias
(74) *Attorney, Agent, or Firm* — Oblon, McClelland, Maier & Neustadt, L.L.P.

(57) ABSTRACT

A diffuser plate capable of achieving excellent appearance quality when an image is projected. A transmissive diffuser plate including a microlens angle modulation distribution group provided on at least one of a light incident surface and a light emitting surface is provided. A microlens angle modulation distribution group includes a plurality of microlenses and an angle modulation part having an angle modulation distribution for angle-modulating a direction of main light emitted from each of the plurality of microlenses. When a ratio $\lambda/P$ of a wavelength $\lambda$ [µm] of the main light to an average arrangement period P [µm] of the microlens is denoted by $\theta$ [rad], and when the direction of the main light emitted from each of the plurality of microlenses is modulated by a modulation angle $\alpha$ [rad], a ratio $\alpha/\theta$ of the modulation angle $\alpha$ to $\theta$ satisfies $0.1 < \alpha/\theta < 10.0$.

8 Claims, 16 Drawing Sheets

(51) Int. Cl.
  *G03B 21/00* (2006.01)
  *G02B 3/00* (2006.01)
  *G02B 5/10* (2006.01)
(52) U.S. Cl.
  CPC ......... *G02B 5/0278* (2013.01); *G02B 5/0284* (2013.01); *G02B 5/10* (2013.01); *G03B 21/00* (2013.01)
(58) Field of Classification Search
  CPC .. G02B 3/0006; G02B 3/0012; G02B 3/0031; G02B 3/0037; G02B 3/0043; G02B 3/005; G02B 3/0056; G02B 5/0205; G02B 5/021; G02B 5/0215; G02B 5/0257; G02B 5/0263; G02B 5/0268; G02B 5/0273; G03B 21/00
  USPC ........ 359/599, 618, 619, 626, 628, 642, 707
  See application file for complete search history.

(56) References Cited

U.S. PATENT DOCUMENTS

| | | | |
|---|---|---|---|
| 9,939,561 B2* | 4/2018 | Miyasaka | ................ G02B 5/02 |
| 2002/0141065 A1 | 10/2002 | Cowan et al. | |
| 2004/0100699 A1 | 5/2004 | Cowan et al. | |
| 2005/0174646 A1 | 8/2005 | Cowan et al. | |
| 2005/0275952 A1 | 12/2005 | Odagiri et al. | |
| 2007/0103747 A1 | 5/2007 | Powell et al. | |
| 2008/0013180 A1 | 1/2008 | Cowan et al. | |
| 2011/0019128 A1 | 1/2011 | Takata | |
| 2017/0235154 A1 | 8/2017 | Uchida et al. | |
| 2018/0106930 A1* | 4/2018 | Uchida | .................. G02B 27/01 |

FOREIGN PATENT DOCUMENTS

| | | |
|---|---|---|
| JP | 2005-258306 A | 9/2005 |
| JP | 2006-162887 A | 6/2006 |
| JP | 2007-523369 A | 8/2007 |
| JP | 2008-282026 A | 11/2008 |
| JP | 2010-145745 A | 7/2010 |
| JP | 2012-226300 A | 11/2012 |
| WO | WO 02/10804 A1 | 2/2002 |
| WO | WO 2009/118946 A1 | 10/2009 |
| WO | WO 2016/051785 A1 | 4/2016 |

OTHER PUBLICATIONS

Extended European Search Report dated Dec. 12, 2019 in European Patent Application No. 17789507.5, 10 pages.
Urey, H. et al., "Microlens-array-based exit-pupil expander for full-color displays", Applied Optics, vol. 44, No. 23, Aug. 10, 2005, pp. 4930-4936.

* cited by examiner

TRANSMISSIVE DIFFUSER PLATE HAVING A MICROLENS ANGLE MODULATION DISTRIBUTION GROUP

TECHNICAL FIELD

The present disclosure relates to a diffuser plate and a projection-type projector device.

BACKGROUND ART

A diffuser plate using a microlens array is used as a screen for head-up displays and laser projectors. An advantage of using the microlens array is that speckle noise in a laser beam can be reduced more than when a diffuser plate such as a translucent plate or ground glass is used.

Patent Literature 1 discloses an image forming apparatus including a diffuser plate. The diffuser plate uses a laser beam as a light source and includes a laser projector that projects an image formed by an arrangement of a plurality of pixels and a microlens array in which a plurality of microlenses are arranged. When a microlens array is used, incident light can be appropriately diffused, and a necessary diffusion angle can be freely designed.

Patent Literature 2 and 3 and Non-Patent Literature 1 disclose a screen using two microlens arrays. When only one microlens array is used, unevenness in luminance and color is likely to occur. Patent Literature 2 and 3 and Non-Patent Literature 1 disclose that by using two microlens arrays, such unevenness in luminance can be prevented from occurring.

Patent Literature 3 discloses that one microlens array including microlenses having properties different from each other can prevent unevenness in luminance caused by diffracted light and interference light generated by a periodic structure from occurring.

Patent Literature 4 discloses a method for reducing uneven luminance and uneven color generated by diffraction spots caused by periodicity of fine structures by providing pistons (raised parts) each having a vertical lateral surface in a microlens or by randomly distributing at least one parameter defining a shape or a position of the fine structure in accordance with a predetermined probability density function.

CITATION LIST

Patent Literature

[Patent Literature 1] Japanese Unexamined Patent Application Publication No. 2010-145745
[Patent Literature 2] Japanese Unexamined Patent Application Publication No. 2012-226300
[Patent Literature 3] Published Japanese Translation of PCT International Publication for Patent Application, No. 2007-523369
[Patent Literature 4] Published Japanese Translation of PCT International Publication for Patent Application, No. 2004-505306

Non-Patent Literature

[Non-Patent Literature 1] H. Urey and K. D. Powell, "Microlens-array-based exit-pupil expander for full-color displays", APPLIED OPTICS Vol. 44, No. 23, p. 4930-4936

SUMMARY OF INVENTION

Technical Problem

Patent Literature 3 does not describe a specific shape and arrangement of the microlenses for preventing the uneven luminance from occurring. Moreover, for example, if a plurality of parameters such as curvatures and installed positions of the microlenses are randomly distributed at the same time in order to even out the unevenness in color and luminance, when the diffuser plate is used as a screen, there is a problem that the image quality deteriorates such that an image will become grainer when it is projected on the screen.

In Patent Literature 4, a plurality of microlenses are raised each in the shape of a piston with a height different from each other on a main surface of the substrate. Further, different phases are given to the respective microlenses to reduce diffracted light and interference light. Then, by using the microlenses having a plurality of radii of curvature, Patent Literature 4 attempts to achieve uniform diffusion properties over the entire diffuser plate. However, when such microlenses are used as a screen, there is a problem that the appearance quality of the image deteriorates such that an image will become grainier when it is projected on the screen.

The present disclosure provides a diffuser plate capable of achieving excellent appearance quality when an image is projected.

Solution to Problem

A transmissive diffuser plate according to the present disclosure is a transmissive diffuser plate including a substrate including a light incident surface on which light is incident and a light emitting surface configured to emit the incident light after transmitting the light, the transmissive diffuser plate including:

a microlens angle modulation distribution group provided on at least one of the light incident surface and the light emitting surface, in which the microlens angle modulation distribution group includes a plurality of microlenses and an angle modulation part having an angle modulation distribution for slightly angle-modulating a direction of main light emitted from each of the plurality of microlenses, and when a ratio $\lambda/P$ of a wavelength $\lambda$ [μm] of the main light to an average arrangement period $P$ [μm] of the microlenses is denoted by $\theta$ [rad], and when the direction of the main light emitted from each of the plurality of microlenses is modulated by a modulation angle $\alpha$ [rad], a ratio $\alpha/\theta$ of the modulation angle $\alpha$ to the $\theta$ satisfies $0.1 < \alpha/\theta < 10.0$.

Further, the microlens angle modulation distribution group may be provided in the substrate in a predetermined pattern periodically repeated.

Further, shapes of bottom surfaces of the microlenses may be rectangles, in the microlens angle modulation distribution group, the plurality of microlenses may be arranged to be a matrix having the number of rows n1 and the number of columns n2, and each of the number of rows n1 and the number of columns n2 may be a natural number from 2 to 9.

Further, two or more types of microlens angle modulation distribution groups may be provided in the substrate in a predetermined pattern periodically repeated.

Further, two or more types of microlens angle modulation distribution groups may be randomly distributed or distributed in accordance with a density function.

Further, the ratio α/θ may be randomly distributed or distributed in accordance with a density function.

Further, the microlens angle modulation distribution group may include two or more types of microlenses.

Further, when a pupil diameter on a projection side seen from the diffuser plate is denoted by θi [rad], the θ may satisfy 0.1×θi≤θ≤4×θi.

Further, the projection-type projector device according to the present disclosure may use this diffuser plate.

Further, a reflective diffuser plate according to the present disclosure is a reflective diffuser plate including a substrate, including a micromirror angle modulation distribution group provided on at least one of main surfaces of the substrate, in which the micromirror angle modulation distribution group includes a plurality of micromirrors and an angle modulation part having an angle modulation distribution for slightly angle-modulating a direction of main light reflected from each of the plurality of micromirrors, the micromirror has a shape the same as that of a convex lens or a concave lens, and when a ratio λ/P of a wavelength λ [μm] of the main light to an average arrangement period P [μm] of the micromirrors is denoted by θ [rad], and when the direction of the main light emitted from each of the plurality of micromirrors is modulated by a modulation angle α [rad], a ratio α/θ of the modulation angle α to the θ satisfies 0.025<α/θ<2.5.

Advantageous Effects of Invention

According to the present disclosure, it is possible to provide a diffuser plate capable of achieving excellent appearance quality when an image is projected.

DESCRIPTION OF EMBODIMENTS

First Embodiment

With reference to the drawings, a diffuser plate according to a first embodiment will be explained.
(Shape of Diffuser Plate)

Figure 1A:
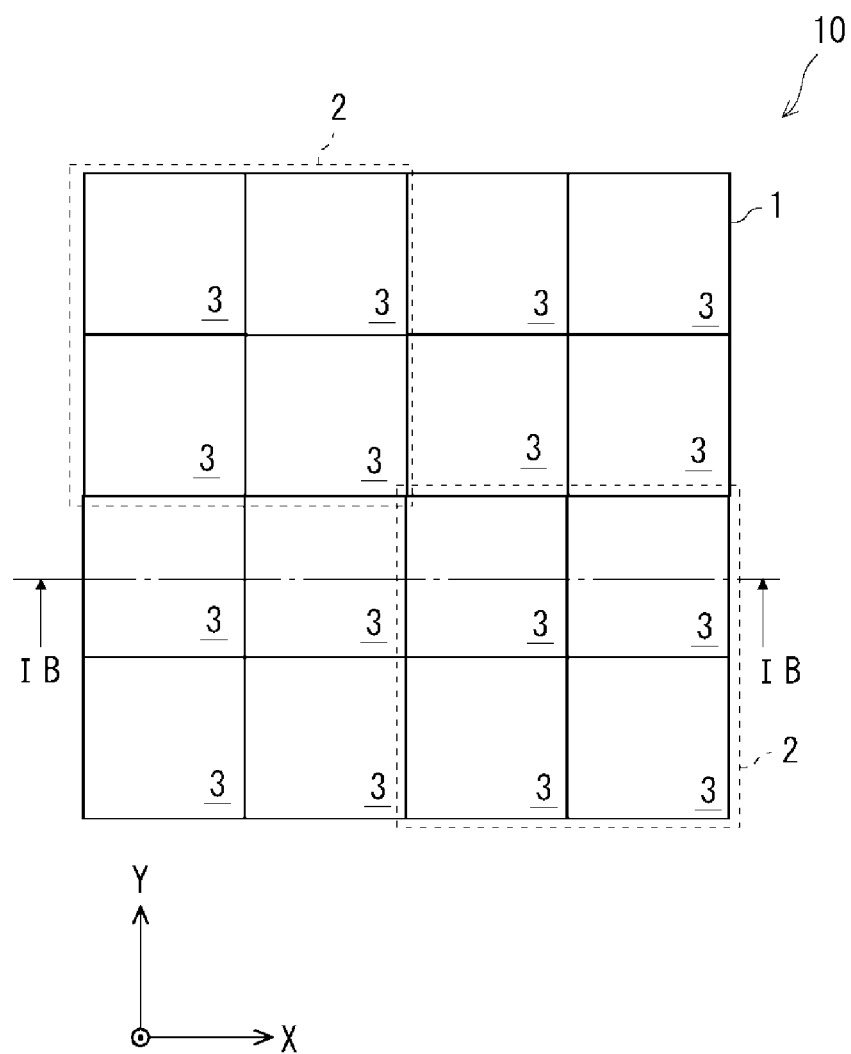
FIG. 1A is a top view of a diffuser plate according to a first embodiment.
Figure 1B:
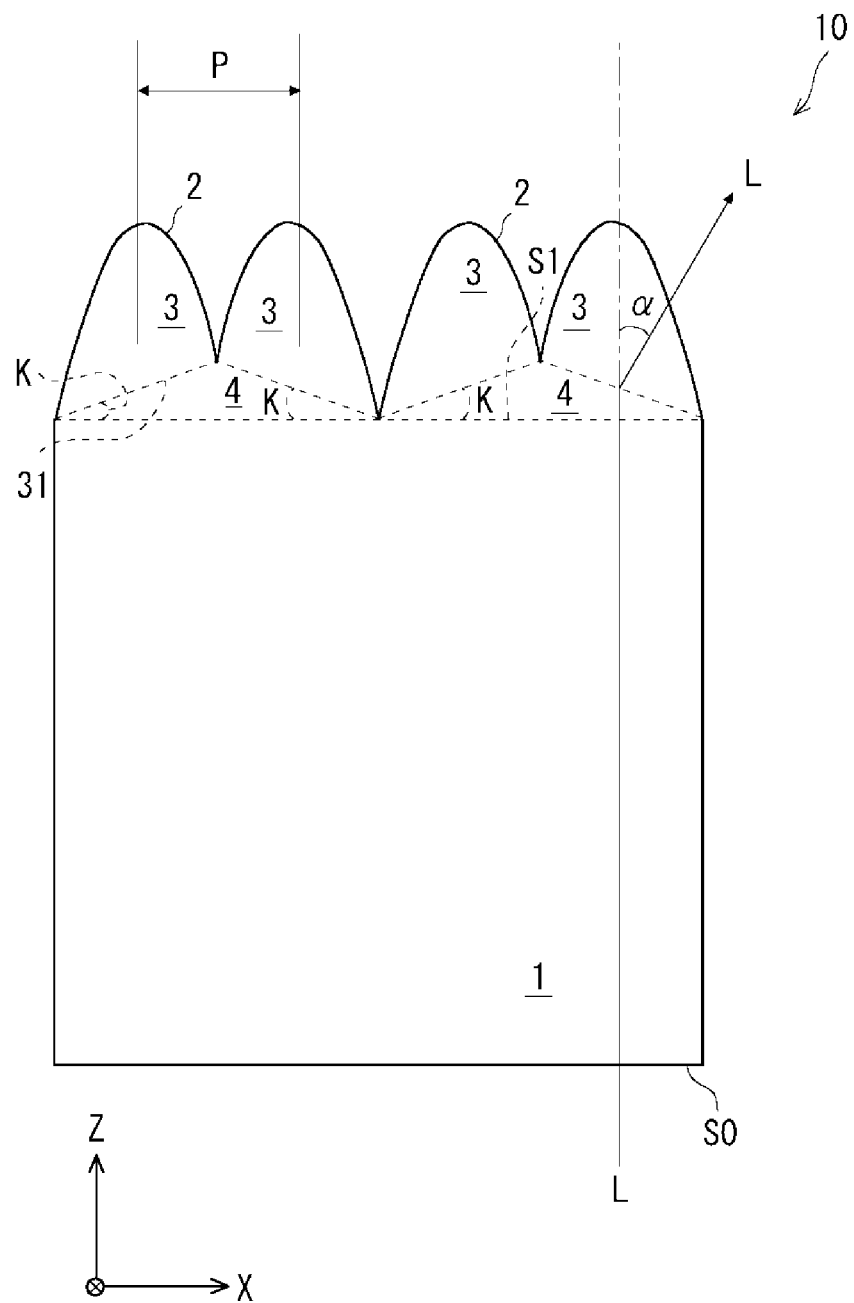
FIG. 1B is a cross-sectional view of the diffuser plate according to the first embodiment.

FIG. 1A is a top view of the diffuser plate according to the first embodiment. FIG. 1B is a cross-sectional view of the diffuser plate according to the first embodiment. FIG. 1B does not include hatching in order to make the drawing easier to see. As shown in FIGS. 1A and 1B, a diffuser plate 10 includes a substrate 1 having main surfaces S0 and S1, and an angle modulation distribution group 2 (this is also referred to as a microlens angle modulation distribution group). The angle modulation distribution group 2 includes a plurality of microlenses 3 that emit main light beams whose optical axes are different from one another along an angle modulation distribution, and an angle modulation part 4. On the main surface S1 of the substrate 1, the angle modulation distribution group 2, that is, a pair of the plurality of microlenses 3 and the angle modulation part 4, is arranged in a lattice shape, which forms a microlens array. The angle modulation part 4 is, for example, a quadrangular pyramid or a quadrangular pyramid frustum, and the plurality of microlenses 3 are supported by a plurality of respective pyramidal surfaces in the angle modulation part 4. Assume a case in which, for example, light L is made incident on the main surface S0 of the substrate 1 of the diffuser plate 10. Then the substrate 1 causes the light L to be transmitted therethrough, and the light L reaches the angle modulation distribution group 2. Further, the angle modulation part 4 and the microlens 3 in the angle modulation distribution group 2 cause the light L to be transmitted therethrough and cause the transmitted light to be emitted from the microlens 3. The direction of the main light that has been emitted is modulated at a modulation angle α with respect to the direction of the light L that has been input to the main surface S0 of the substrate 1 of the diffuser plate 10. In other words, the optical axis of the main light derived from the light L that has been emitted and the optical axis of the light L that has been input to the main surface S0 of the substrate 1 of the diffuser plate 10 intersect with each other, and the angle of these optical axes is the modulation angle α. The main surface S0 is one example of a light incident surface and the surface of the microlens 3 is one example of a light emitting surface.

The light L may be made incident on the main surface S1 of the substrate 1 of the diffuser plate 10, then transmitted, and after that emitted from the main surface S0. Further, the diffuser plate 10 may be a transmissive diffuser plate that transmits light or may be a reflective diffuser plate that reflects light.

As shown in FIG. 1B, in the cross section vertical to the main surface S1 of the substrate 1, bottom surfaces 31 of the plurality of microlenses 3 are slightly tilted with respect to the main surface S1. The microlenses 3 that are adjacent to each other and whose bottom surfaces 31 are tilted relative to each other are arranged on the main surface S1 of the substrate 1 in such a way that they are periodically repeated. Specifically, these microlenses 3 that are adjacent to each other are arranged on the main surface S1 at a predetermined pitch P (this is also referred to as an average arrangement period P). The predetermined pitch P may be the center-to-center distance of the microlenses 3 that are adjacent to each other. As described above, the lens parameters of the respective microlenses 3 include, besides the components with the basic microlens shape, angle modulation components.

The diffuser plate 10 may be incorporated into a projection-type projector device. A projection-type projector device (not shown) includes the diffuser plate 10 and a projection device that projects a projection light on the diffuser plate 10.

(One Specific Example of Diffuser Plate)

Figure 2:
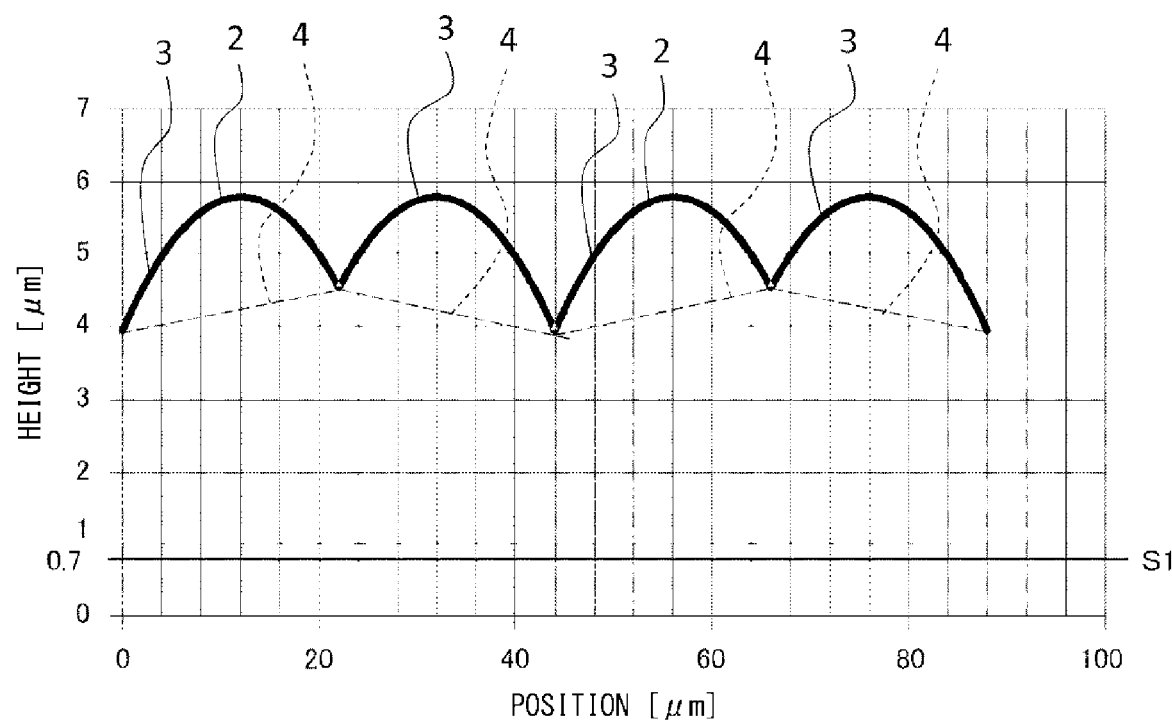
FIG. 2 is a view showing one specific example of a cross-sectional profile of a cross section vertical to a main surface of the diffuser plate according to the first embodiment.

FIG. 2 shows a cross-sectional profile of a cross section vertical to the main surface of one specific example of the diffuser plate according to the first embodiment. FIG. 2 shows the position and the height that correspond to each of the angle modulation distribution group 2 and the main surface S1 in the diffuser plate 10. The vertical axis of FIG. 2 indicates the height from the part that corresponds to a predetermined part of the substrate 1 of the diffuser plate 10 on the substrate of the diffuser plate in this specific example. Specifically, the height of the main surface that corresponds to the main surface S1 is made about 0.7 [μm].

Figure 3:
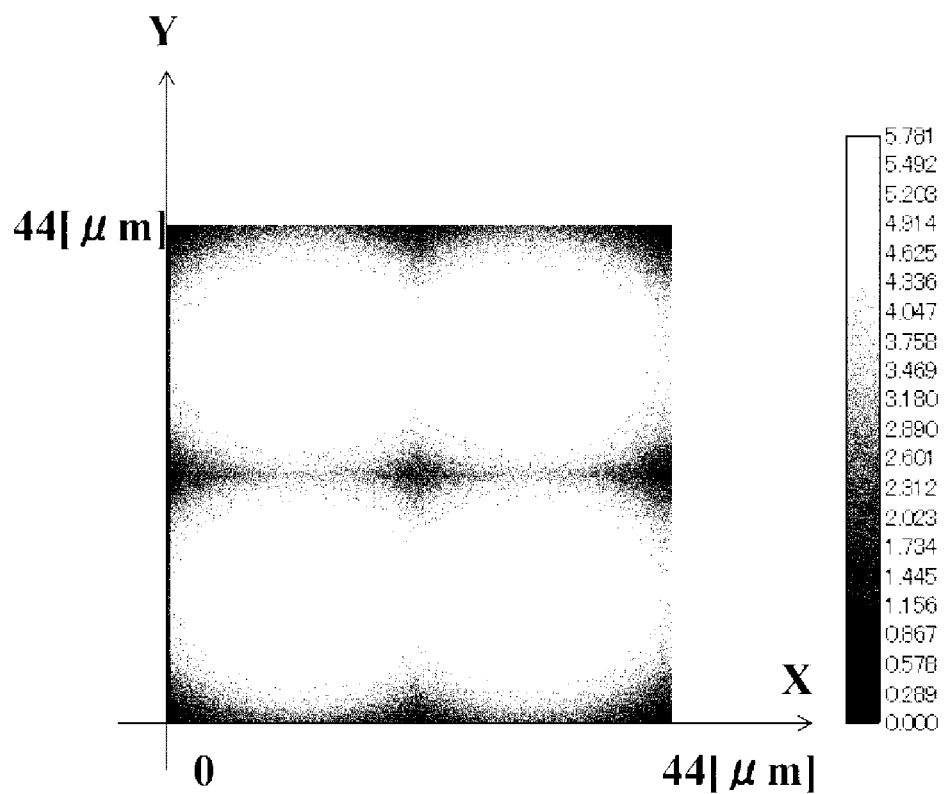
FIG. 3 is a view showing a height distribution in a microlens array of one specific example of the diffuser plate according to the first embodiment.

FIG. 3 is a view showing a height distribution in the microlens array of one specific example of the diffuser plate according to the first embodiment. This microlens array is a square plate, and the length of one side thereof is 44 μm. This microlens array is one specific example of a basic unit in which microlenses having angle modulation components can be periodically repeated. The angle modulation is set at a pitch P the same as that of the microlenses, has a tilt in each of the X direction and the Y direction, and the angle modulation distribution group in this example is a combination made of 2×2, that is, four types of minute slopes of two vertical rows and two horizontal columns. In the microlens array, the microlenses are arranged in a predetermined pattern on the substrate in such a way that they are periodically repeated. The microlenses having angle modulation components are closely arranged on the whole main surface S1 of the substrate 1 of the diffuser plate 10. The vertical axis and the horizontal axis in FIG. 3 represent coordinates on the main surface S1, and heights of the microlenses from the main surface S1 are represented by differences in shades. In FIG. 3, the thicker the color becomes, the closer the microlens is to the main surface S1, whereas the thinner the color becomes, the greater the height of the microlens is from the main surface S1. As shown in FIG. 3, it is preferable to arrange the plurality of microlenses in a lattice shape on the main surface S1.

In the diffuser plate according to one specific example of the cross-sectional profile shown in FIG. 3, the angle modulation distribution group is a repeat unit of microlenses arranged in accordance with one angle modulation distribution, and specifically, a combination of 2×2, or two vertical rows and two horizontal columns. The angle modulation distribution group is not limited to this combination and may be, for example, a combination of 3×3, or three vertical rows and three horizontal columns or may be a combination of (2-9)×(2-9), or 2-9 vertical rows and 2-9 horizontal columns. That is, a plurality of microlenses are arranged on the substrate as a matrix having the number of rows n1 and the number of columns n2 and each of the number of rows n1 and the number of columns n2 may be a natural number from 2 to 9. Alternatively, the angle modulation distribution group may be a combination of 10 or larger ×10 or larger. While the microlenses are arranged in a lattice shape in FIG. 3, the arrangement of the microlenses is not limited to the rectangular lattice and instead may be a tetragonal lattice, a regular triangular lattice, an oblique lattice, a parallel lattice, or the like. Further, the shapes of bottom surfaces of the plurality of microlenses are not limited to rectangles such as squares or rectangles and instead may be quadrangles, hexagons, or other polygons. In this case, regarding the combination of the angle modulation distribution as well, the unit structures may be periodically repeated in such a way that the arrangement is filled. Further, it is preferable that the plurality of microlenses be periodically arranged on the main surface S1.

(Manufacturing Method)

Figure 4:
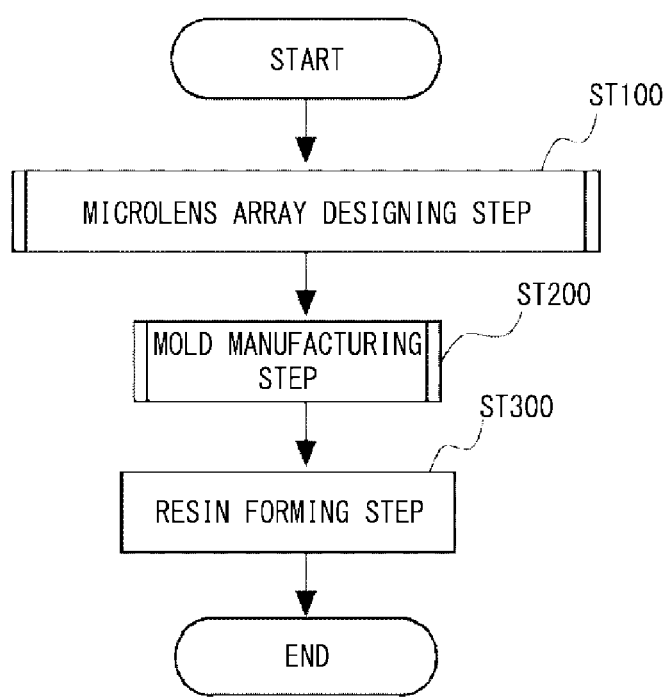
FIG. 4 is a flowchart showing a method for manufacturing the diffuser plate according to the first embodiment.

With reference next to FIG. 4, a method for manufacturing the diffuser plate according to the first embodiment will be explained. FIG. 4 is a flowchart showing the method for manufacturing the diffuser plate according to the first embodiment. The method for manufacturing the diffuser plate 10 includes a step (ST100) for designing a microlens array that exhibits a desired light diffusion property, a step (ST200) for manufacturing a mold of the microlens array, and a step (ST300) for transferring a shape of the microlens array to a resin using the mold.

(Method for Manufacturing Transmissive Diffuser Plate)

In this example, each step will be explained in order taking a case in which the diffuser plate 10 is a transmissive diffuser plate as an example.

(Microlens Array Designing Step S100)

Figure 5:
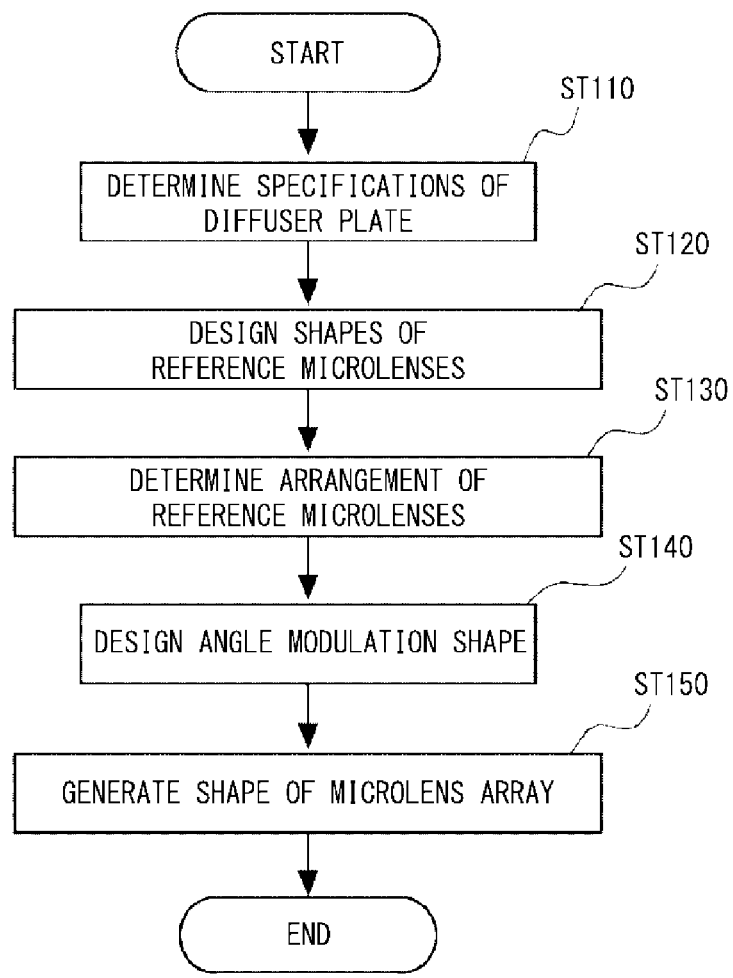
FIG. 5 is a flowchart showing a design process of the microlens array according to the first embodiment.

As shown in FIGS. 4 and 5, in the microlens array designing step S100, the shape of the reference microlens 30 to be a reference (see FIG. 6) and the angle modulation distribution (see FIG. 7) are separately designed. FIG. 5 is a flowchart showing a designing step of the microlens array according to the first embodiment.

First, the specifications of the optical properties (in particular, a refractive index) of a material used as the diffuser plate 10 and the wavelength used, and a required diffusion property are determined (ST110).

Figure 6:
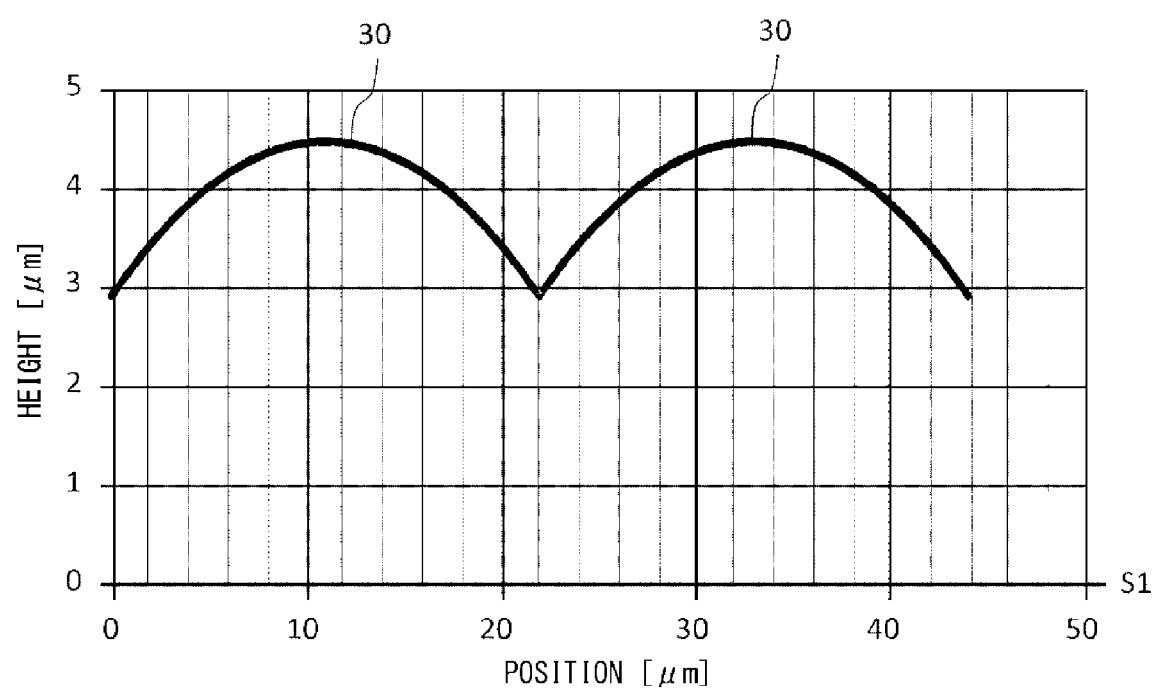
FIG. 6 is a view showing a cross-sectional profile of a plurality of reference microlenses according to the first embodiment.

Next, the shapes of the reference microlenses 30 are designed (ST120). The shape of the reference microlens 30 may be a spherical surface or an aspherical surface or may be any other shape as long as it satisfies the specification of the desired diffusion property. Although there may be any number of kinds of the reference microlenses 30 used for designing the diffuser plate 10, the number of kinds of the reference microlens 30 is preferably a small number within a range that satisfies necessary properties. FIG. 6 shows a view showing a cross-sectional profile in the X direction of the plurality of reference microlenses according to the first embodiment. Specifically, FIG. 6 shows a cross-sectional profile in the X direction of the microlens array in which spherical lenses having a single curvature are arranged as an example of the shape of the reference microlens 30. In FIG. 6, a position that corresponds to the main surface S1 of the substrate 1 (not shown) that supports the reference microlens 30 is shown.

In the diffuser plate 10, it is better that the plurality of microlenses 3 are packed at the highest possible density. Thus, the bottom surface of the reference microlens 30 is preferably in a shape that allows closest packing such as a square, rectangular, or regular hexagon. However, this shall not apply, for example, when it is desired to give anisotropy to the optical properties of the diffuser plate 10. In such a case, the shape and the aspect ratio of the bottom surface of the reference microlens 30 may be arbitrarily specified.

Next, the arrangement of the reference microlenses 30 is determined (ST130). Specifically, an arrangement pattern and the pitch p of the reference microlenses 30 in the unit area on the main surface S1 are determined. In the diffuser plate for the projection-type projector device, the pitch P is an important design element and the pitch P is preferably set from the pupil diameter on the projection side seen from the diffuser plate. Specifically, the projection side is a side of the projection device that the projection-type projector device includes.

When the pitch of the microlenses of the diffuser plate is denoted by P and the wavelength is denoted by λ, a diffraction light interval Δd, which is the interval of the diffraction light of the light that has transmitted through the diffuser plate, is a value that is approximated by λ/P. When the diffraction light interval λd of the diffuser plate is not substantially the same as or smaller than the pupil diameter θi on the projection side seen from the diffuser plate, that is, when it greatly exceeds the pupil diameter θi on the projection side seen from the diffuser plate, the diffraction light is visually recognized more strongly, which causes the image quality to be dramatically degraded. Therefore, the diffraction light interval Δd of the diffuser plate is preferably equal to or smaller than 4×θi but equal to or larger than 0.1×θi. That is, the relation among the diffraction light interval Δd of the diffuser plate, the wavelength λ, the pitch P of the microlenses of the diffuser plate, and the pupil diameter θi on the projection side seen from the diffuser plate can be expressed using the following relational expressions 1 and 2.

$$\Delta d \approx \theta = \lambda / P \quad \text{(relational expression 1)}$$

$$0.1 \times \theta i \leq \theta \leq 4 \times \theta i \quad \text{(relational expression 2)}$$

When, for example, the projection-type projector device with θi=3.3 [deg] is used, λ and P are preferably set to 630 nm and 22 μm, respectively, so that the diffraction light interval Δd is approximated by about 1.6 [deg] by using the relational expression 1, which corresponds to about 0.5×θi, which is preferable since it satisfies the relational expression 2. Further, as shown in FIG. 3, it is preferable that the reference microlenses 30 be arranged on the main surface S1 in a lattice shape.

With reference once again to FIG. 5, the description regarding the microlens array designing step (ST100) in the design of the diffuser plate 10 will be continued. After ST130 is executed, the angle modulation part 4 that tilts the reference microlens 30 at a small angle with respect to the main surface S1 of the substrate 1 is designed (ST140). The reference microlens 30 is made to have a minute slope for each pitch P of the microlenses in the diffuser plate 10, and this inclination is determined by the lens pitch P and the pupil diameter θi on the projection side. The slight tilt amount is determined from the diffraction light interval Δd calculated from the pitch P of the microlens array using the aforementioned relational expression 1. When λ=630 nm and P=22 μm, the diffraction light interval Δd is about 1.6 [deg].

Figure 7:
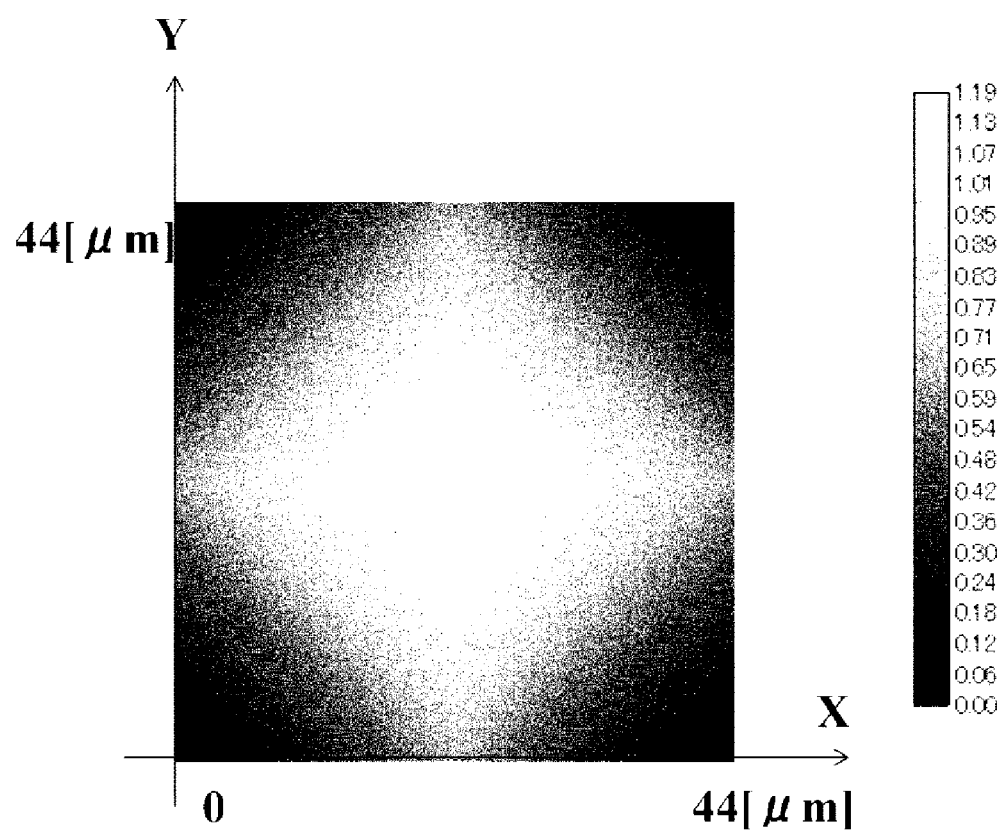
FIG. 7 is a view showing a height distribution of one specific example of an angle modulation part of the diffuser plate according to the first embodiment.

Now, influences of the number of parts with different slight tilt amount in the angle modulation distribution group will be discussed. In a quadrangular pyramid-like angle modulation distribution group (this is also referred to as a pyramid-like angle modulation distribution group) in which the microlenses 3 (see FIG. 1B) are arranged in the angle modulation part 4 (see FIG. 1B) by 2×2, that is, two horizontal rows and two vertical columns, as shown in FIG. 7, each of the diffraction spots can be separated into four parts. FIG. 7 is a view showing a height distribution of one specific example of the angle modulation part of the diffuser plate according to the first embodiment.

Figure 11:
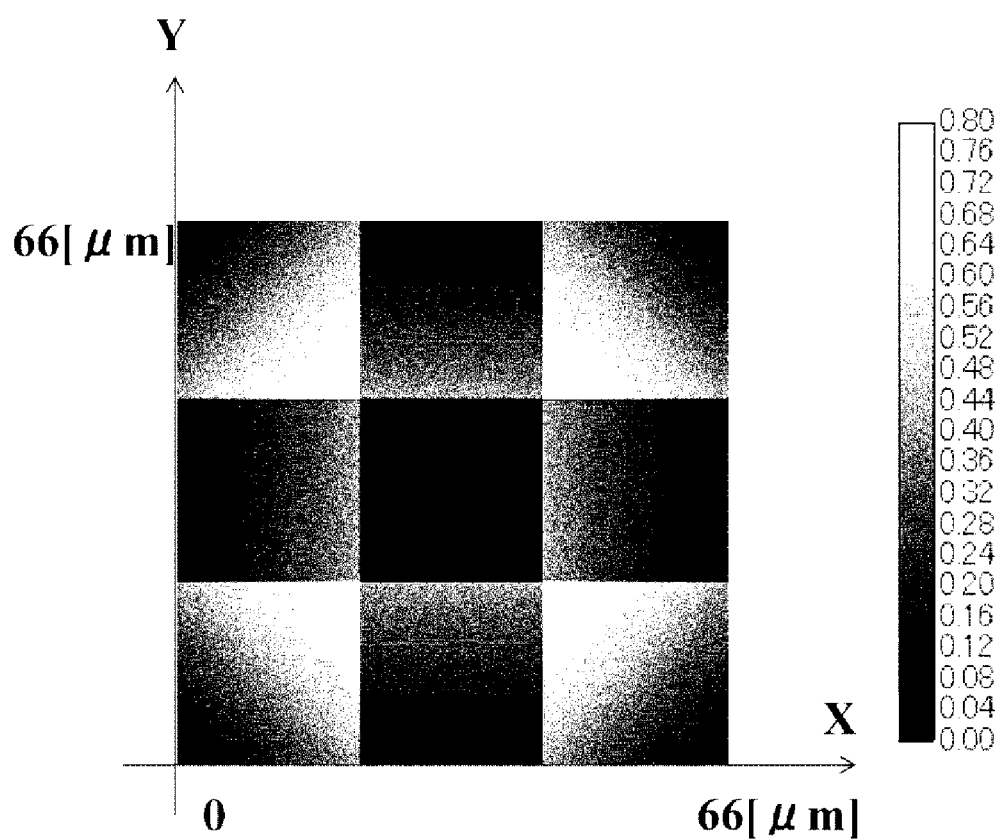
FIG. 11 is a view showing a height distribution of another specific example of the angle modulation part of the diffuser plate according to the first embodiment.

Further, in a quadrangular pyramid frustum-like angle modulation distribution group in which the microlenses 3 (see FIG. 1B) are arranged in the angle modulation part 4 (see FIG. 1B) by 3×3, that is, three horizontal rows and three vertical columns as shown in FIG. 11, each of the diffraction spots can be separated into nine parts. FIG. 11 is a view showing a height distribution according to another specific example of the angle modulation part of the diffuser plate according to the first embodiment. While the diffraction spot can be separated into an increasingly larger number of parts as the number of parts with different slight tilt amounts in the angle modulation distribution group increases, since effectiveness is reduced if the size of the basic angle modulation distribution group is made larger than the pixel size of the projector on the diffuser plate, it is preferable that the size of the basic angle modulation distribution group be typically not more than twice the size of the pixel. Further, if the pixel size is about 100 μm and the pitch of the microlenses is about 11 μm, the angle modulation distribution group of 9×9, that is, nine horizontal rows and nine vertical columns, corresponds to this pixel size. Therefore, in this specific example, the angle modulation distribution group 2 in which the microlenses 3 are arranged in the angle modulation part 4 by 9×9, that is, nine horizontal rows and nine vertical columns, becomes the largest. The angle modulation distribution group 2 preferably has a size equal to or smaller than this size.

While it is preferable that the same angle modulation distribution groups 2 be repeatedly arranged on the substrate 1 for the sake of easiness of the design, geometric patterns having periodic patterns or similar patterns may be seen on the appearance of the diffuser plate or poor appearance may be caused. Therefore, although the design becomes more complicated, by arranging two or more types of plurality of angle modulation distribution groups 2 in such a way that they are periodically repeated, randomly distributing two or more types of angle modulation distribution groups 2, or arranging them in accordance with a rule or a density function, it is possible to reduce the periodic geometric patterns.

Further, in a projector projection system where periodic geometric patterns tend to occur, the angle modulation distribution group 2 is not used, the microlens provided in this projector projection system is made to have a minute slope, and the direction of the main light emitted from this microlens is modulated by a predetermined microlens modulation angle α (see FIG. 1B). In other words, the microlens modulation angle α, which is an angle at which the main light is bent by the angle modulation distribution, determines the interval of the diffraction light to be separated. The microlenses have microlens modulation angles α different from one another. The ratio of the main wavelength λ [µm] to the pitch P [µm] of the microlenses is denoted by θ. In this transmissive diffuser plate, the respective factors such as the microlens modulation angle α, the main wavelength λ, the pitch P of the microlenses etc. are adjusted in such a way that the relation between the ratio θ and the microlens modulation angle α satisfies $0.1 < α/θ < 10.0$ (relational expression 3), whereby it is possible to reduce the periodic geometric patterns.

Even when the diffuser plate 10 is a reflective diffuser plate, the respective factors such as the microlens modulation angle α, the main wavelength λ, the pitch P of the microlenses etc. are adjusted in such a way that the relation between the ratio θ and the microlens modulation angle α satisfies $0.025 < α/θ < 2.5$ (relational expression 4), whereby it is possible to reduce the periodic geometric patterns.

In this example, taking a case of one specific example of an angle modulation distribution in which the microlenses 3 are arranged in the angle modulation part 4 by 2×2, that is, two horizontal rows and two vertical columns as an example, details of the design of an angle of the angle modulation distribution will be explained.

When the pitch P of the microlenses 3 is 22 µm and the main wavelength λ of the light that is made incident on the diffuser plate 10 is 630 nm, the diffraction light interval Δd is about 1.6 deg. Therefore, in general, the diffraction light separation is preferably equal to or smaller than this value, and more preferably, equal to or smaller than the half of this value.

Incidentally, there is light incident on the reference surface of the diffuser plate 10, specifically, the main surface S0, vertically. In this case, when the angle of the slope in the angle modulation part 4 of the angle modulation distribution that is tilted with respect to the main surface S1 of the substrate 1 is denoted by K (see FIG. 1B) and the refractive index of the microlens 3 is denoted by n, the light that has transmitted through the angle modulation part 4 is bent approximately by $(n-1) \times K$ [deg]. That is, α can be approximated by about $α ≈ (n-1) \times K$. Therefore, in the angle modulation distribution in which the microlenses 3 are arranged in the angle modulation part 4 by 2×2, that is, two horizontal rows and two vertical columns, one diffraction spot is separated at the interval of $\pm(n-1) \times K$ [deg]. When K=1.6 [deg], the light is bent by about 0.8 [deg] by the angle modulation part 4.

Next, shape information of the angle modulation distribution group 2 is generated (ST150). Specifically, by adding the height of the angle modulation part 4 shown in FIG. 7 in each position on the XY plane (position in the Z direction) and the height of the reference microlens 30 shown in FIG. 6 in each position on the XY plane (position in the Z direction), the height in each position of the angle modulation distribution group 2 shown in FIGS. 1A, 1B, and 2 is calculated. That is, after the completion of ST150, the position in the height direction (Z direction) of the plurality of microlenses 3 of the microlens array is a position obtained by adding the height of the angle modulation part 4 and the height of the reference microlens 30 in each position on the XY plane.

The optical properties of the diffuser plate 10 can be obtained by a wave optics calculation method based on the scalar theory. As there are a huge number of combinations of the design of the microlens array that includes the angle modulation part 4 having an optimal angle modulation distribution and the plurality of microlenses 3, an optimum combination is preferably searched by the means of a computer.

(Microlens Array Designing Step S100 in Method for Manufacturing Reflective Diffuser Plate Including Micromirror Having Microlens Shape)

Next, a case in which the diffuser plate 10 is a reflective diffuser plate and the plurality of microlenses 3 are convex lenses will be discussed. When a reflective diffuser plate is used, as the diffusion pattern formed on the surface does not transmit light, the microlenses are not strictly lenses and correspond to mirrors. Therefore, it is appropriate that the microlenses be referred to as, for example, "micromirrors". However, a mirror having a lens-like concavo-convex shape shall be also referred to as a "microlens" in this specification. When a reflective diffuser plate is used, since the effect of a minute angle modulation distribution tends to appear more strongly compared to a case in which a transmissive diffuser plate is used, care should be taken to design the angle modulation distribution. Further, while the case in which the plurality of microlenses 3 are convex lenses is discussed in this example, the plurality of microlenses 3 may be concave lenses.

Compared to the design example in the transmissive type shown in the method for manufacturing the transmissive diffuser plate described above, in the reflective type, when the angle of the slope in the angle modulation part 4 that is tilted with respect to the main surface S1 of the substrate 1 is denoted by K, the incident light is thereby bent by $2 \times K$ [deg]. That is, it can be substantially approximated by $α ≈ 2 \times K$. Since the diffraction light interval does not depend on the transmission or the reflection, when, for example, the diffraction light interval Δd of the microlens array is set to 1.6 [deg], effects similar to those in the design example in the method for manufacturing the transmissive diffuser plate described above are achieved if the slope angle K is set to about 0.4 [deg]. Accordingly, in the reflective diffuser plate, it is preferable that the relation between the ratio θ and the microlens modulation angle α satisfy $0.025 < α/θ < 2.5$.

Many processing methods such as machining, photolithography using a mask, maskless lithography, etching, laser ablation, and the like can be used as a method for processing a microlens array from design data. A mold is manufactured using these techniques, and a resin is molded using the mold to manufacture the diffuser plate 10 including the microlens array. The mold may be used as a direct reflective diffuser plate. The method for molding the diffuser plate 10 may be appropriately selected from a number of molding methods such as roll-to-roll molding, hot press molding, molding using an ultraviolet curable resin, injection molding, and the like. When the microlens array is used as a reflective diffuser plate, a reflective film such as Al (Aluminum) may be formed on a surface of lenses having a curvature of the microlens array.

(Mold Manufacturing Step ST200 and Resin Molding Step ST300)

Figure 8:
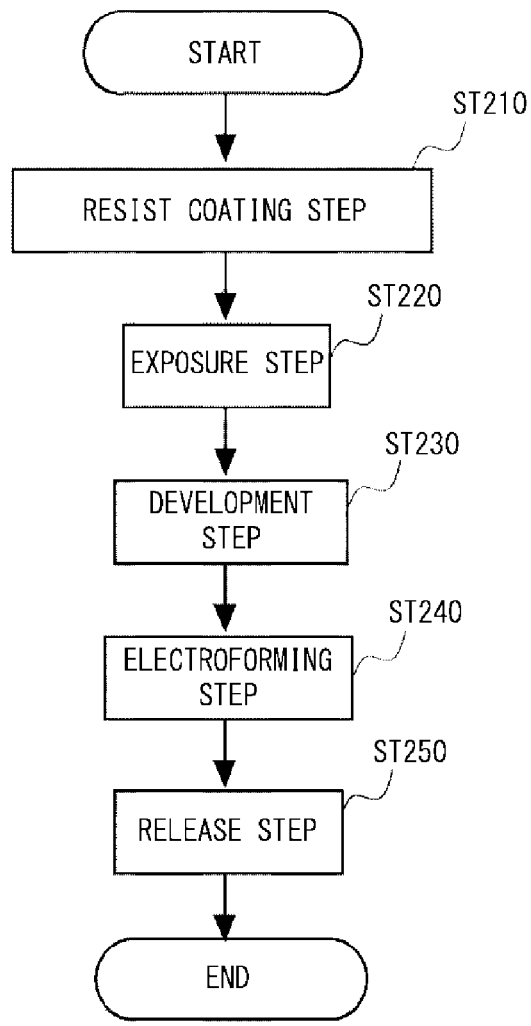
FIG. 8 is a flowchart showing a mold manufacturing step of the diffuser plate according to the first embodiment.

Next, the mold manufacturing step (ST200) for manufacturing the mold by laser scanning maskless lithography and electroforming, and a resin molding step (ST300) for molding the diffuser plate 10 by using the mold and an ultraviolet curable resin will be described in more detail with reference to FIGS. 4 and 8. FIG. 8 is a flowchart showing a mold manufacturing step of the diffuser plate according to the first embodiment.

The maskless lithography includes a resist coating step (ST210) for coating a photoresist on a substrate, an exposure step (ST220) for exposing a fine pattern to the photoresist, and a development step (ST230) for developing the exposed photoresist to obtain a master having the fine pattern.

First, in the resist coating step (ST210), a positive photoresist is coated on the substrate. The thickness of the coating film of the photoresist may be equal to or greater than the height of the fine pattern to be formed. The coating film is preferably baked at 70° C. to 110° C.

Next, in the exposure step (ST220), a laser beams is scanned and projected on the photoresist coated in the coating step, thereby exposing the photoresist. The wavelength of the laser beam may be selected according to the type of the photoresist, and may be, for example, 351 nm, 364 nm, 458 nm, 488 nm (oscillation wavelengths of an $Ar^+$ laser), 351 nm, 406 nm, 413 nm (oscillation wavelengths of a $Kr^+$ laser), 352 nm, 442 nm (oscillation wavelengths of an He—Cd laser), 355 nm, 473 nm (pulse oscillation wavelengths of a diode-pumped solid-state laser), 375 nm, 405 nm, 445 nm, 488 nm (a semiconductor laser), and the like.

In the exposure step (ST220) of the microlenses 3, the laser beam is scanned on the resist while modulating the laser power to values determined from the shape of the microlenses 3 and resist sensitivity. The laser beam is focused on an objective lens, so that the laser beam is focused on the resist. The laser spot on the resist is commonly a Gaussian distribution with a finite diameter. Therefore, even if the laser power is changed in a stepwise manner, the quantity distribution of light projected on the resist does not become a stepwise distribution and instead becomes a light quantity distribution having a constant slope. By utilizing such a property of laser exposure, a smooth slope shape can be formed.

Next, in the development step (ST230), the exposed photoresist is developed. The development of the photoresist can be carried out by various known methods. There is no particular limitation on a developer solution that can be used. For example, an alkaline developer solution such as tetramethylammonium hydroxide (TMAH) can be used. In the development step (ST230), the photoresist is removed according to the exposure amount, and a fine pattern shape of the photoresist is formed. For example, in the exposure step (ST220), when the exposure is performed with the laser power corresponding to the shapes of concave lenses using a positive resist, a master of the microlenses 3 in which concave lens shapes are formed in the photoresist is obtained.

Next, in the electroforming step (ST240), a metal film is formed, by vapor deposition of nickel metal or the like, on the surface of the photoresist having the fine pattern formed in the exposure step and development step by maskless lithography. Then, the mold is manufactured.

In the electroforming step (ST240), firstly, the surface of the photoresist having the fine pattern is subjected to conductivity treatment by vapor deposition of nickel metal or the like. Next, nickel is deposited into a plate shape on the surface of the nickel deposited film to a desired thickness by electroforming.

Next, in a release step (ST250), the nickel plate formed in the electroforming step (ST240) is released from the photoresist master. Then, a mold (stamper) having convex lens shapes in which concave lens shapes on the photoresist are reversely transferred is obtained. If concave lens shapes are required, the electroforming step may be performed once again.

Next, in the resin molding step (ST300), the resin is molded using the stamper formed in the mold manufacturing step (ST200).

More specifically, firstly, an appropriate amount of, for example, a photocurable resin is applied to the surface of the stamper. Next, a base material is placed on the photocurable resin. Specifically, while the base material is pressed against the photocurable resin with a hand roller and scraping off the extra photocurable resin, the base material is placed on the photocurable resin. Next, ultraviolet light is projected from the base material side to cure the photocurable resin. Note that a material that can transmit light such as ultraviolet light is used as the base material. Next, the base material is released from the stamper. A layer of the photocurable resin is formed on the base material released from the stamper. Further, a structure of the stamper is reversely transferred to the layer of the photocurable resin, whereby the microlens array is formed. According to the aforementioned steps, the diffuser plate 10 can be manufactured.

(Method for manufacturing Reflective Diffuser Plate Including Micromirror Having Microlens Shape)

When the diffuser plate 10 is used as the reflective diffuser plate, the micromirror is formed by, for example, vacuum-depositing an aluminum reflective film on the surface of a member where the microlens array has been formed. Further, light may be made incident on the aluminum surface of the micromirror and this incident light may be reflected. Further, when a member where the microlens array is formed on only one surface of the substrate is used, the diffuser plate may be configured in such a way that light enters a flat surface of the substrate and is reflected on the microlens array surface on which the aluminum reflective film is formed. This microlens array surface on which the aluminum reflective film is formed may be referred to as a micromirror.

On the other hand, the diffuser plate 10 may include a microlens array surface on which no reflective film is formed and a flat surface on which the reflective film is formed. In this case, light may be input to the microlens array surface where the reflective film is not formed and the light may be reflected on the flat surface on which the reflective film is formed.

Further, the diffuser plate 10 may be configured such that microlens arrays are formed on respective surfaces of the substrate. In this case, the diffuser plate may be configured such that the thickness of the reflective film on the light incident side is adjusted to be a half mirror and the thickness of the reflective film on the rear surface of the incident surface is adjusted so that the reflectance will become approximately 100%. Accordingly, the diffuser plate 10 includes two microlens arrays on front and rear surfaces. Further, if necessary, a protective layer may be further formed to protect the aluminum reflective film.

From the discussion above, in the diffuser plate 10 according to the present disclosure, the plurality of microlenses 3 are each supported by the angle modulation part 4 and the angle modulation distribution group 2 that gives the angle modulation to the plurality of microlenses 3 is arranged in a predetermined pattern so that they are periodically repeated. Accordingly, a spot caused by diffraction can be divided into a plurality of parts, and unevenness in luminance and color may be reduced without giving an influence on graininess. Accordingly, it is possible to provide a diffuser plate that achieves both optical properties with little luminance and color unevenness and good appearance quality.

EXAMPLES

Next, Examples of the diffuser plate 10 according to this embodiment will be explained.

In Example 1, using the aforementioned method for manufacturing the diffuser plate according to the first embodiment, the microlens array on the main surface S1 and the angle modulation part 4 have been separately designed.

When the diffuser plate according to Example 1 was designed, the extension of the pupil of a projector light source projected on the diffuser plate, that is, a pupil diameter θi on the projection side was assumed to be 3.3 deg (0.0576 rad), and the wavelength λ of the main light was assumed to be 630 nm. Accordingly, it is sufficient that the pitch P [μm] of the microlenses fall within in a range of λ/(4θi)<P<21λ/(0.1θi), where P=22 [μm], from the relational expressions 1 and 2. Therefore, since the ratio θ [rad] of the wavelength λ [μm] to the pitch P [μm] of the microlenses becomes θ=0.0286 [rad], it is sufficient that each microlens modulation angle α [rad] fall within a range of 0.1<α/θ<10.0, α=0.0269 (=1.54 [deg]), and α/θ≈0.94. The angle modulation distribution in this example has a slight tilt of 1.54 [deg] both in the X direction and the Y direction, and regarding each tilting angle, the direction of the tilt is determined so that a tilt distribution having a quadrangular pyramidal shape or a pyramid-like tilt distribution is obtained. Further, the angle modulation distribution groups 2 were arranged on the main surface of the substrate in such a way that they are periodically repeated using 2×2, that is, two horizontal rows and two vertical columns as one unit. The angle modulation part 4 that has been designed is shown in FIG. 7.

Next, the shape of the microlens 3 will be explained. The shape of the microlens 3 may be a common rotationally symmetric shape. In this case, the cross section of the microlens 3 is expressed by the following relational expression 5. In this expression, C is a curvature [1/μm], $K_E$ is a constant of the cone, r is a distance from a central axis, and z is a sag amount with reference to the intersection between the center axis and the lens surface. The curvature C is expressed by C=1/R using a curvature radius R.

$$Z = \frac{-Cr^2}{1 + \sqrt{1 - (K_E + 1)C^2 r^2}} \quad (5)$$

The cross-sectional shape of the reference microlens 30 used in the diffuser plate according to this example is expressed by the following relational expression 6. In this case, the reference microlens 30 is a toroidal lens having a rectangular bottom surface, and curvatures are respectively defined in the X direction and the Y direction. In this expression, the center axis of the lens is the origin, $r_x$ is a distance from the center axis in the X direction, $r_y$ is a distance from the center axis in the Y direction, $C_x$ is a curvature [1/μm] in the X direction (XZ plane), $C_y$ is a curvature [1/μm] in the Y direction (YZ plane), $K_x$ in the (XZ plane) is a constant of the cone in the X direction (XZ plane), and $K_y$ is a constant of the cone in the Y direction (YZ plane).

$$Z = \frac{-Cr_x^2}{1 + \sqrt{1 - (K_x + 1)C^2 r_x^2}} + \frac{-Cr_y^2}{1 + \sqrt{1 - (K_y + 1)C^2 r_y^2}} \quad (6)$$

In the diffuser plate according to this example, the pitch of the microlenses 3 was Px=22 μm and Py=22 μm, the curvature radius $R_x$ [μm] in the X direction was $R_x$ [μm]=40 with spherical lenses ($K_x$=0). The curvature radius $R_y$ [μm] in the Y direction was $R_y$ [μm]=22 with spherical lenses ($K_y$=0). Further, for all the reference microlenses 30, it is assumed that the height of the lowest part is as the reference height.

By adding the height of the angle modulation part 4 in each position on the XY plane (position in the Z direction) and the height of the reference microlens 30 in each position on the XY plane (position in the Z direction), the height of the angle modulation distribution group 2 in each position on the XY plane is calculated. It is therefore possible to obtain the shape of the angle modulation distribution group 2.

Figure 9:
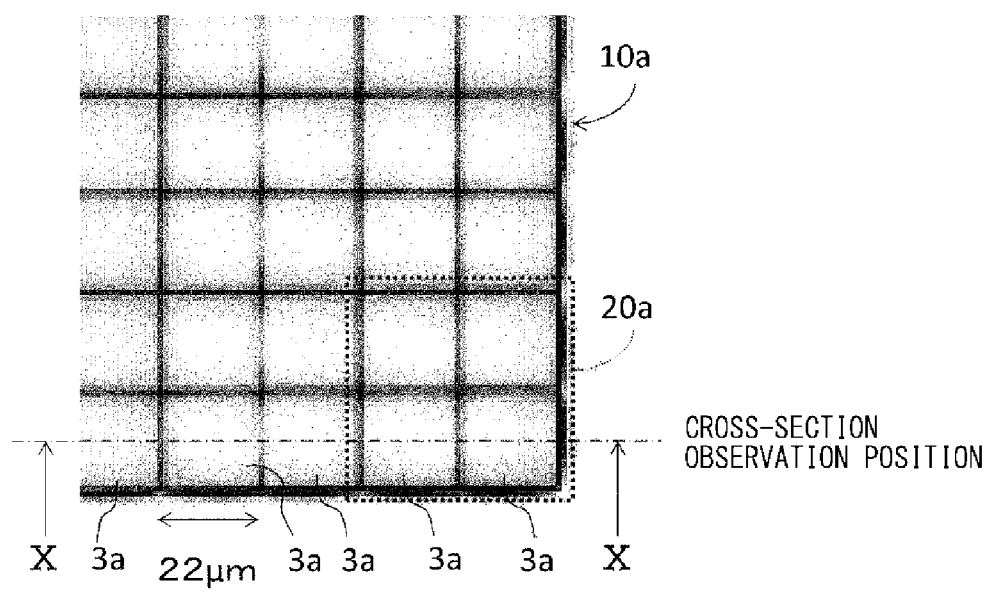
FIG. 9 is a view showing a laser microscope observation image of a stamper used for manufacturing the diffuser plate according to Example 1.
Figure 10:
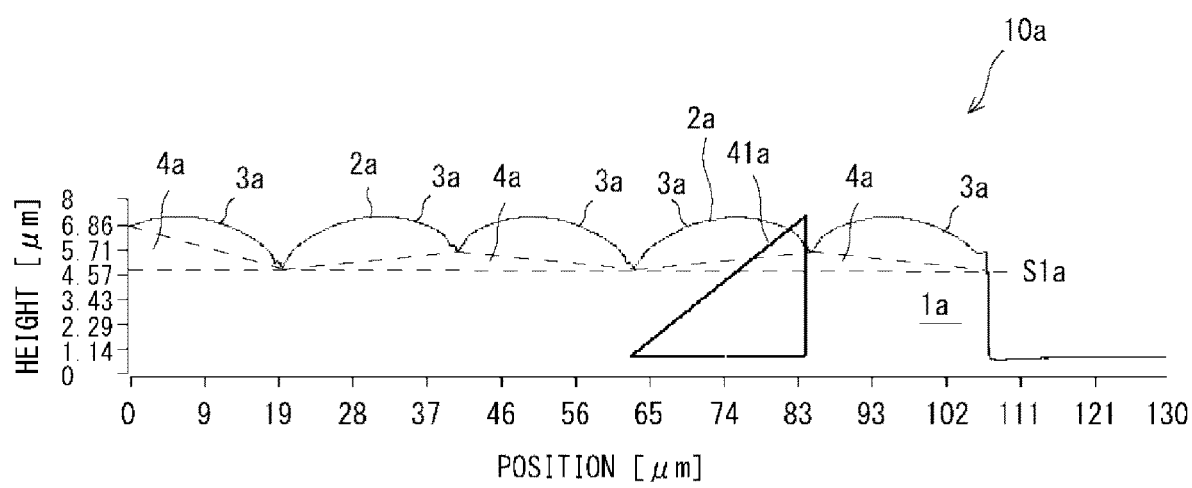
FIG. 10 is a cross-sectional profile that crosses the center of a micro lens array shape part of a stamper used for manufacturing a diffuser plate according to Example 1.

A microlens array area of about 30 mm×60 mm on the surface of the diffuser plate 10 was designed based on the above-mentioned contents (ST100). Using the design data, a stamper on which a microlens array shape part having a plurality of convex lenses is formed was obtained through the aforementioned mold manufacturing step (ST200). FIG. 9 shows an observation image of the lens shape of this stamper captured by a confocal laser microscope, and FIG. 10 shows a cross-sectional profile that crosses the center of the micro lens array shape part. That is, FIG. 9 is a diagram showing a laser microscope observation image of a stamper used for manufacturing the diffuser plate according to Example 1. FIG. 10 is a cross-sectional profile that crosses the center of the micro lens array shape part of the stamper used for manufacturing the diffuser plate according to Example 1. As shown in FIGS. 9 and 10, a stamper 10a includes an angle modulation distribution group correspondence part 2a that corresponds to the angle modulation distribution group 2 (see FIG. 2) of the diffuser plate 10 and a microlens correspondence part 3a that corresponds to the microlenses 3 of the diffuser plate 10. The length of one side of the microlens correspondence part 3a is 22 μm. Further, the stamper 10a includes a substrate correspondence part 1a that corresponds to the substrate 1 (see FIG. 1B) of the diffuser plate 10 and an angle modulation part correspondence part 4a that corresponds to the angle modulation part 4. In FIG. 10, for the sake of clarity, an angle modulation correspondence part element 41a, which is a part of the angle modulation part correspondence part 4a, is enlarged. The angle modulation correspondence part element 41a has a shape that is triangular protruding upwardly, the slope thereof is tilted in such a way that the height thereof increases as the position thereof gets longer. As shown in FIG. 10, the microlens correspondence part 3a has a protruding convex lens shape. Further, the microlens correspondence part 3a located in the position 62-84 μm is tilted in such a way that the height thereof increases as the position thereof gets longer like the angle modulation correspondence part element 41a. That is, in FIGS. 9 and 10, it can be seen that a plurality of convex lens shapes in which minute slopes are provided are formed.

Next, using the stamper shown in FIG. 9, molding was performed using a photocurable resin. Using a polycarbonate film having a thickness of 0.3 mm as a base material, an acrylic photocurable resin having a refractive index of 1.52 was poured between the stamper and the base material to perform the molding, whereby the diffuser plate according to Example 1 was manufactured.

Figure 12:
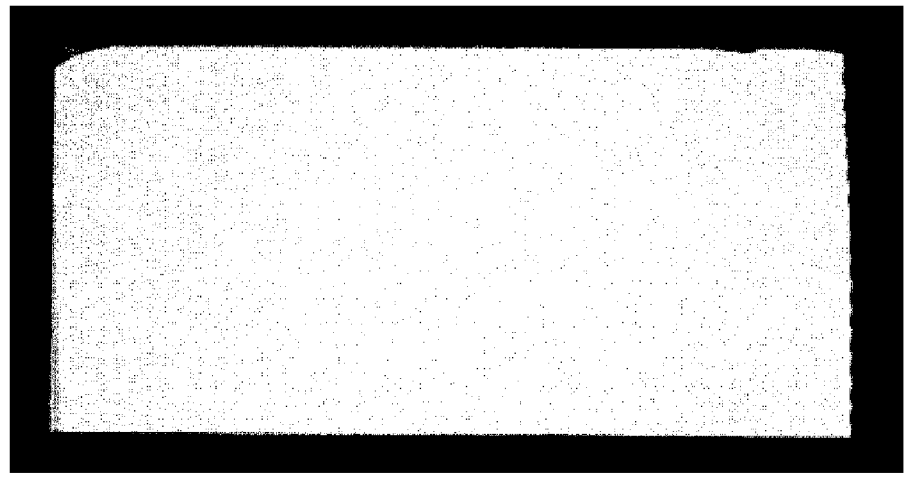
FIG. 12 is an image projected on the diffuser plate according to Example 1.
Figure 13:
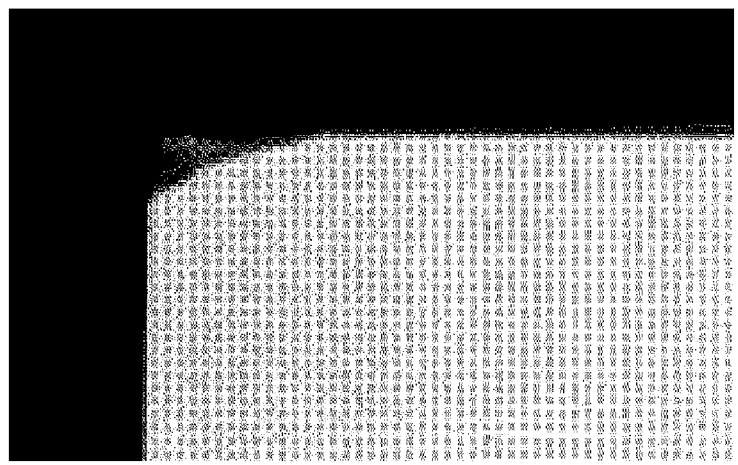
FIG. 13 is an image in which an upper left part of the diffuser plate according to Example 1 shown in FIG. 12 is enlarged.

FIG. 12 is a diagram showing a result of projecting, by a projector using an LED light source, a white image on the diffuser plate according to this example obtained by the molding, reflecting an image obtained by reflecting the transmitted light on a concave mirror again on the glass surface, and then capturing the image by a digital camera. That is, FIG. 12 is an image projected on the diffuser plate according to Example 1. FIG. 13 is an image in which the upper left part of the diffuser plate according to Example 1 shown in FIG. 12 is enlarged.

Figure 14:
FIG. 14 is an image projected on a diffuser plate according to Example 2.
Figure 15:
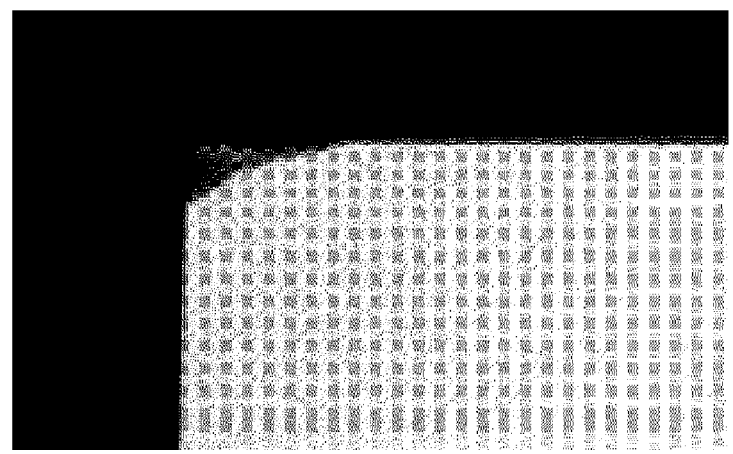
FIG. 15 is an image in which an upper left part of the diffuser plate shown in FIG. 14 is enlarged.

FIG. 14 is an image projected on the diffuser plate according to Example 2. The diffuser plate according to Example 2 was designed using a designing method similar to that in this example except for the design of the angle modulation part. In the diffuser plate according to Example 2, the angle modulation part has a quadrangular pyramid frustum shape, or a truncated quadrangular pyramid shape, the angle modulation distribution of the angle modulation part is formed of an angle modulation distribution group of 3×3, that is, three horizontal rows and three vertical columns, and the basic slope angle is set to 1.04 [deg]. FIG. 15 is an image in which the upper left part of the diffuser plate shown in FIG. 14 is enlarged.

FIG. 11 shows a height with respect to each position of Example 2. In this example, microlenses at the four corners are each set to 1.04 [deg] in the X and Y directions and the surfaces thereof are tilted in such a way that the height thereof increases toward the microlens which is at the center of the 3×3 angle modulation distribution group. Further, the four microlenses that are adjacent to the microlens which is at the center of the 3×3 angle modulation distribution group are tilted in such a way that the height thereof increases toward the center by 1.04 [deg] only in the X or Y direction. The microlens which is arranged at the center of the 3×3 angle modulation distribution group has no tilt, that is, a flat surface that is substantially parallel to the substrate is set. Using this 3×3 angle modulation distribution group as a basic unit, the microlenses are arranged on the main surface S1 of the substrate 1 in such a way that they are periodically repeated or they are closely arranged on the whole main surface S1 of the substrate 1.

Results of Comparison 1 with Comparative Example according to Related Art

Figure 16:
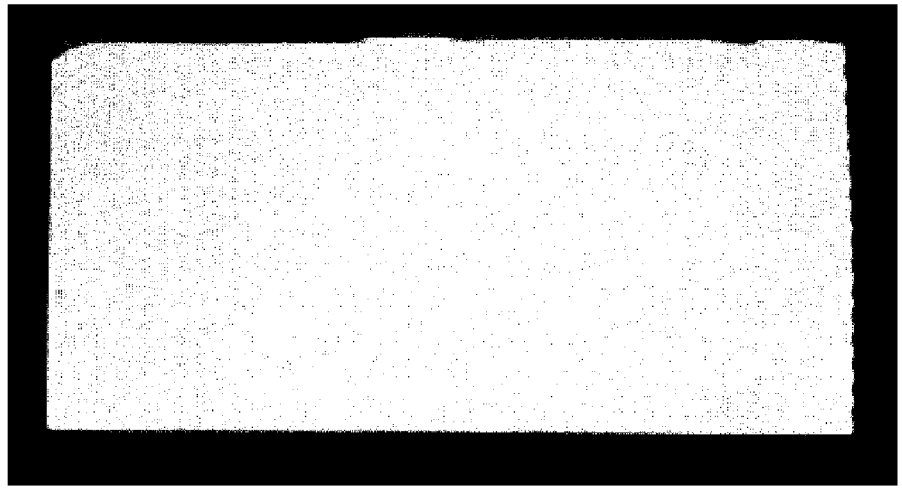
FIG. 16 is an image projected on a diffuser plate according to Comparative Example 1.
Figure 17:
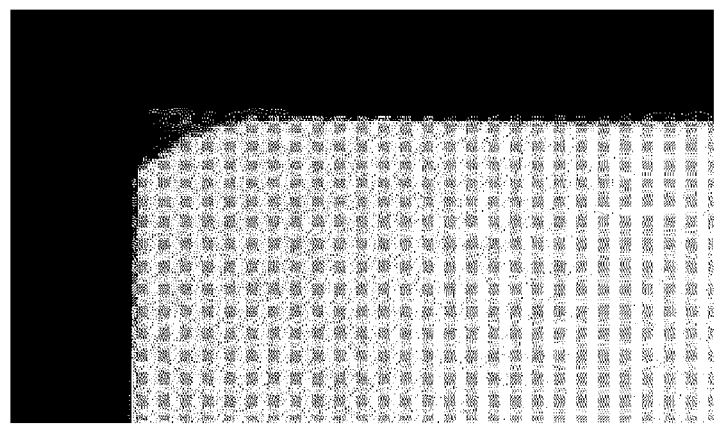
FIG. 17 is an image in which an upper left part of the diffuser plate according to Comparative Example 1 shown in FIG. 16 is enlarged.

Next, results of comparing Examples 1 and 2 with Comparative Example 1 according to related art will be explained. FIG. 16 is an image projected on a diffuser plate according to Comparative Example 1. FIG. 17 is an image in which the upper left part of the diffuser plate according to Comparative Example 1 shown in FIG. 16 is enlarged.

Comparative Example 1 is a microlens array manufactured using the related art. The microlens array according to Comparative Example 1 has a structure the same as that of the microlens array according to Example 1 except that it does not include an angle modulation part. That is, the microlens array according to Comparative Example 1 is formed of only a reference microlens having a shape the same as that of the microlens array according to Example 1.

As shown in FIGS. 12-17, in Examples 1 and 2, color unevenness was less than that in Comparative Example 1 and graininess was as good as that in Comparative Example 1.

[Results of Comparison 2 with Comparative Example According to Related Art]

Figure 18:
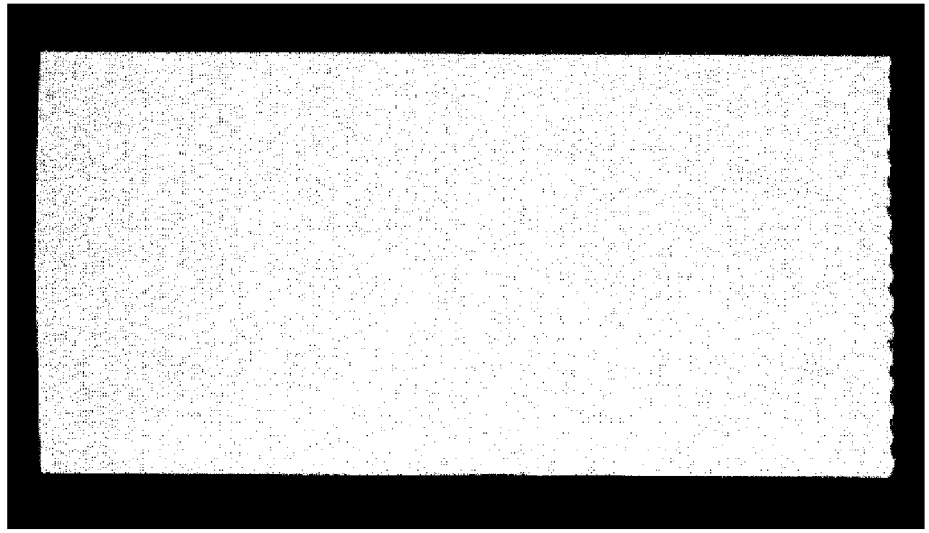
FIG. 18 is an image projected on a diffuser plate according to Comparative Example 2.
Figure 19:
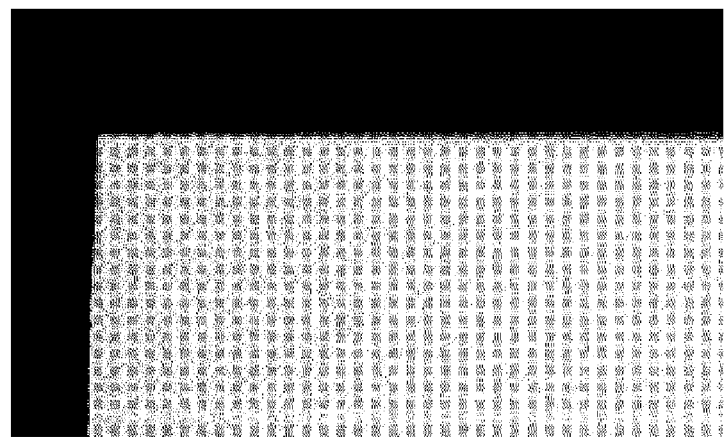
FIG. 19 is an image in which an upper left part of the diffuser plate according to Comparative Example 2 shown in FIG. 18 is enlarged.

Next, results of comparing Examples 1 and 2 with Comparative Example 2 according to related art will be explained. FIG. 18 is an image projected on a diffuser plate according to Comparative Example 2. FIG. 19 is an image in which the upper left part of the diffuser plate according to Comparative Example 2 shown in FIG. 18 is enlarged.

Comparative Example 2 is an example in which a microlens array having a random pattern like the one disclosed in Patent Literature 4 is manufactured using a stamper. Specifically, in the microlens array according to Comparative Example 2, at least one of the parameters that define the shape or the position of the fine structure is randomly distributed in accordance with a predetermined probability density function. The diffuser plate according to Comparative Example 2 has a toroidal lens shape, similar to the shape in this example, and in each of the microlens arrays, the pitch in the X direction was 60 µm, the radii of curvature $R_x$ [µm] were 135.3, 170.8, 162.5, and 136.2 with the spherical lens ($K_x$=0) the pitch in the Y direction was 60 µm, the radii of curvature $R_y$ [µm] were 58.5, 57.9, and 65.8 with the aspherical lens ($K_y$=−0.45). The lens shapes of the respective microlenses are randomly set in the X or Y direction.

While little color unevenness was seen, the surface of the image was generally rough and was strongly grainy in Comparative Example 2. As shown in FIGS. 12-15, 18, and 19, in Examples 1 and 2, the image was less grainy and the quality was better than that in Comparative Example 2.

Note that the present disclosure is not limited to the above embodiments, and various modifications can be made without departing from the scope thereof. For example, the microlenses 3 arranged on the diffuser plate 10 are not limited to transmissive lenses. A light diffusion pattern (this is also called a micromirror) having a concavo-convex shape similar to that of the microlenses 3 may be formed on the main surface S1 of the reflective diffuser plate 10 in a lattice like the microlenses 3.

Alternatively, instead of the plurality of microlenses 3, a plurality of fine structures having a lens function may be arranged on the diffuser plate 10. The fine structures each having a lens function may be, for example, one that refracts light by a refractive index distribution formed by fine structures of subwavelength.

This application is based upon and claims the benefit of priority from Japanese Patent Application No. 2016-088904, filed on Apr. 27, 2016, the disclosure of which is incorporated herein in its entirety by reference.

REFERENCE SIGNS LIST

10 DIFFUSER PLATE
1 SUBS IRATE
2 (MICROLENS) ANGLE MODULATION DISTRIBUTION GROUP
3 MICROLENS
4 ANGLE MODULATION PART

The invention claimed is:
1. A transmissive diffuser plate, comprising a substrate including a light incident surface on which light is incident and a light emitting surface configured to emit the incident light after transmitting the light, the transmissive diffuser plate comprising:
  a microlens angle modulation distribution group provided on at least one of the light incident surface and the light emitting surface,
  wherein:
    the microlens angle modulation distribution group comprises a plurality of microlenses and an angle modulation part having an angle modulation distribution for slightly angle-modulating a direction of main light emitted from each of the plurality of microlenses; and
    when a ratio λ/P of a wavelength, λ [µm] of the main light to an average arrangement period P [µm] of the microlenses is denoted by θ [rad], and
    when the direction of the main light emitted from each of the plurality of microlenses is modulated by a modulation angle α [rad], then a ratio $\alpha/\theta$ of the modulation angle $\alpha$ to the $\theta$ satisfies $0.1<\alpha/\theta<10.0$.

2. The diffuser plate according to claim 1, wherein the microlens angle modulation distribution group is provided in the substrate in a predetermined pattern periodically repeated.

3. The diffuser plate according to claim 2, wherein:
shapes of bottom surfaces of the microlenses are rectangles; and
in the microlens angle modulation distribution group, the plurality of microlenses are arranged to be a matrix having n1 number of rows and n2 number of columns; n1 and n2 being independently a natural number from 2 to 9.

4. The diffuser plate according to claim 2, wherein two or more types of microlens angle modulation distribution groups are provided in the substrate in a predetermined pattern periodically repeated.

5. The diffuser plate according to claim 2, wherein two or more types of microlens angle modulation distribution groups are randomly distributed or distributed in accordance with a density function.

6. The diffuser plate according to claim 1, wherein the ratio $\alpha/\theta$ is randomly distributed or distributed in accordance with a density function.

7. The diffuser plate according to claim 1, wherein the microlens angle modulation distribution group includes two or more types of microlenses.

8. A projection-type projector device, comprising
the diffuser plate according to claim 1, wherein when a pupil diameter on a projection side seen from the diffuser plate is denoted by $\theta i$ [rad], the $\theta$ satisfies $0.1 \times \theta i \leq \theta \leq 4 \times \theta i$.

* * * * *